United States Patent [19]

Ratcliffe

[11] 4,115,523
[45] Sep. 19, 1978

[54] SYNTHESIS OF HYDROXYLAMINE FROM HYDROGEN SULFIDE AND NITRIC OXIDE

[75] Inventor: Charles T. Ratcliffe, Morristown, N.J.

[73] Assignee: Allied Chemical Corporation, Morris Township, Morris County, N.J.

[21] Appl. No.: 848,975

[22] Filed: Nov. 7, 1977

[51] Int. Cl.$^2$ ............................................. C01B 21/14
[52] U.S. Cl. .................................. 423/387; 423/573 R
[58] Field of Search ............... 423/235, 387, 388, 573

[56] References Cited

U.S. PATENT DOCUMENTS

| | | | |
|---|---|---|---|
| 2,752,224 | 6/1956 | Joris | 423/388 X |
| 3,767,758 | 10/1973 | Mars | 423/387 X |

OTHER PUBLICATIONS

Bagster, L. S., "Journal of the Chem. Soc.," 1928, pp. 2631–2643.

*Primary Examiner*—G. O. Peters
*Attorney, Agent, or Firm*—Robert J. North; Robert A. Harman

[57] ABSTRACT

An improved process is described for producing hydroxylamine, NH$_2$OH, a valuable intermediate in the industrial manufacture of nylon-6, in which hydrogen sulfide is reacted with nitric oxide, or mixtures of nitrogen oxides, in aqueous acidic media containing a solid sulfur-resistant catalyst, such as activated carbon, at ambient temperature and pressure and substantially in the absence of elemental oxygen.

An important aspect of the invention is that the industrial waste gases, hydrogen sulfide and nitrogen oxide, can be effectively utilized in the process.

6 Claims, No Drawings

SYNTHESIS OF HYDROXYLAMINE FROM HYDROGEN SULFIDE AND NITRIC OXIDE

BACKGROUND OF THE INVENTION

1. Field of the Invention

This invention relates to an improved process for producing hydroxylamine in which hydrogen sulfide is reacted with nitrogen oxide in aqueous acidic media, containing a sulfur-resistant catalyst and substantially in the absence of elemental oxygen.

2. Brief Description of the Prior Art

Hydroxylamine, $NH_2OH$, is a valuable intermediate in the overall synthesis of nylon-6. In one commercial process, the reagent is reacted with cyclohexanone to produce cyclohexanone oxime, which then undergoes a Beckmann-type rearrangement to form caprolactam, which is then polymerized to produce the industrially valuable polyamide, nylon-6.

Several commercial processes for manufacturing hydroxylamine are currently in use. One process that is employed, the Raschig process, is illustrated by the following equation:

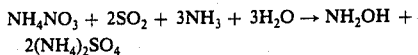

which utilizes the reduction of ammonium nitrate with a bisulfite solution of sulfur dioxide.

Another process currently in use involves the direct reduction of nitric oxide with hydrogen gas. Nitric oxide is first prepared by the catalytic reduction of ammonia with a platinum-rhodium catalyst. The formed nitric oxide is subsequently reduced with hydrogen gas in acidic aqueous media using a slurried platinum or other noble metal catalyst. The process is further described in the article, "Manufacture of Hydroxylamine by Catalytic Reduction of Nitric Oxide", appearing in Nitrogen, No. 50, pp. 27 (1967), including patent references. Use of a sulfided platinum catalyst in the above process is also described in U.S. Pat. Nos. 3,959,469 (1976) and 3,295,925 (1967).

However, the above processes require the use of industrial grade chemicals and the in situ preparation of nitrogen oxide and fail to utilize waste industrial chemicals which are produced in the chemical industry.

Two industrial waste products, hydrogen sulfide, $H_2S$, and nitric oxide, are currently produced in large quantities from commercial processes, and are normally discarded. Waste hydrogen sulfide is normally present in natural gas wells, which must be removed from natural gas before use, and is also obtained from petroleum refining and coal and oil cleaning operations. Under current pollution standards, more of this waste gas is expected to be generated. Waste nitrogen oxides, represented by the formula, $NO_x$ and including NO, $NO_2$, $N_2O_3$, and mixtures thereof, are produced for example, from nitric acid manufacture which occurs on a large industrial scale. Methods of utilizing these waste materials for manufacturing other important industrial chemicals are constantly being searched for.

The reaction between hydrogen sulfide and nitric oxide is known, but has not been studied with respect to utilizing these materials in producing other valuable industrial chemicals.

The reference, J. Phys. Chem., Vol. 35, pp. 1721-24 (1931), describes the reaction of NO with $H_2S$ solution to yield ammonium thiosulfate, ammonium nitrite, sulfur, nitrous oxide and nitrogen. The reaction was shown to be more rapid in the presence of sulfuric acid. Pure nitrogen was produced in the process with an excess of hydrogen sulfide while nitrous oxide was formed with an excess of the nitrogen oxidizing agent. However, no hydroxylamine was detected in the reaction mixture (see p. 1721).

The reference, J. Chem. Soc. 2631-43 (1928), describes the reaction of hydrogen sulfide with nitrous acid, in the absence of a catalyst, wherein the nitrous acid is prepared from a mixture NO and $O_2$ and is passed into a vessel containing hydrogen sulfide. When nitrous acid was in excess, nitrogen oxide and smaller quantities of nitrous oxide were produced, while variable yields of ammonia and hydroxylamine were produced when excess hydrogen sulfide was present.

We have surprisingly found that superior yields of hydroxylamine are produced when hydrogen sulfide is reacted with nitric oxide, or mixtures of nitrogen oxides, in aqueous acidic media, in the presence of a solid sulfur-resistant catalyst and substantially in the absence of elemental oxygen. The reaction is conducted in an aqueous acidic media having a pH below 7, and preferably from about 1 to 4, using a $H_2S/NO_x$ molar ratio of about 3:1, and an activated carbon catalyst.

The process thus provides a new economical route to the synthesis of hydroxylamine while at the same time providing a new use for the industrial waste materials of hydrogen sulfide and nitrogen oxide.

SUMMARY OF THE INVENTION

In accordance with this invention, there is provided an improved process for producing hydroxylamine including reacting excess hydrogen sulfide with nitric oxide, or mixtures of nitrogen oxides, in aqueous acidic media of pH below 7, at ambient temperature and pressure, the improvement which comprises conducting the reaction in the presence of a solid sulfur-resistant catalyst and substantially in the absence of elemental oxygen.

DETAILED DESCRIPTION OF THE INVENTION AND PREFERRED EMBODIMENTS

The invention process is generally conducted by passing concurrent feed streams of hydrogen sulfide gas and nitrogen oxide gas into a stirred aqueous acidic solution containing a slurried solid sulfur-resistant catalyst, at a pH of below 7, at ambient temperature and pressure, wherein substantially all the air or elemental oxygen has been flushed out or removed from the system.

The general overall process using nitrogen oxide, NO, for illustration, can be represented by the following equation:

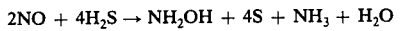

Thus, one mole of hydroxylamine, is formed by the reduction of 2 moles of NO with 4 moles of $H_2S$. The by-products, sulfur and ammonia are also important industrial chemicals and can be recovered for use in other industrial processes.

The novelty in the invention is twofold; one, the discovery that sulfur-resistant catalysts significantly increase the conversion and yield of hydroxylamine in the reaction and provide the basis for a continuous, as well as a batch process; and two, the discovery that higher yields of hydroxylamine are obtained in substantially the absence of elemental oxygen. By the term "substantially" is meant up to about 10 volume percent of the atmosphere contacting the liquid reaction mixture or about 3 weight percent of the liquid reaction media as dissolved oxygen. It has been found that elemental oxygen not only decreases the yield of hydroxylamine in the process but also undesirably increases the yield of byproduct ammonia.

Sulfur-resistant catalysts employed in the reaction must be solid and stable to poisoning by either hydrogen sulfide or by-product sulfur in the reaction, must be able to form a catalytic complex with hydrogen sulfide and nitric oxide in solution to effect the reaction, and must be stable under the acidic aqueous conditions employed. Representative examples of suitable catalysts for use in the process include activated carbon, molecular sieves, supported or non-supported sulfided materials of cobalt, molybdenum, nickel, tungsten, rhodium, platinum, palladium, iron, bismuth and mixtures thereof. A preferred catalyst in the process is activated carbon. An activated carbon catalyst which was found to be useful in the reaction is JXC Activated Carbon, manufactured by Union Carbide Co.

The amount of catalyst used is generally about 0.05 to 0.2 parts by weight per part of hydrogen sulfide in the reaction.

Generally, the catalyst is used in a particle size range of about −100 to +140 mesh for high yields of hydroxylamine in the process, and is usually used in a slurry form in the aqueous acid medium.

Methods of preparation and pretreatment of the catalysts employed herein are well known in the art and are described in the text "Catalytic Process and Proven Catalysts", C. L. Thomas, 1970, Academic Press.

Hydrogen sulfide gas used in the process can be of any conventional type including reagent grade, industrial grade or technical grade, such as is obtained in the scrubbing and scouring operations of stack gases, petroleum fractions and the like. In general, hydrogen sulfide will comprise at least about 60 volume percent of the total volume of gas. Other constituents of the gas which may be present and not deleterious to the process include carbon monoxide and lesser amounts of hydrogen. Air or oxygen are not desirable. Also, liquid hydrogen sulfide may be employed in the process if desired.

Hydrogen sulfide gas is usually used in the process in a molar ratio of about 3:1 of $H_2S/NO_x$ for effective results. Larger and slighter smaller ratios of the gases can also be used effectively.

Nitrogen oxide, designated herein as $NO_x$, can be nitric oxide, NO, nitrogen dioxide, $NO_2$, nitrogen trioxide, $N_2O_3$, or mixtures thereof.

Nitrogen oxide gas used in the process can be of any conventional type including reagent grade, industrial grade or technical grade, such as is produced in the chemical industry, e.g., the effluent from nitric acid manufacture. In general, nitrogen oxide gas will comprise at least about 10 volume percent of the total gaseous mixture. Other constituents of the gas may be present and not deleterious to the process include nitrogen, and nitrous oxide. Also, liquid nitrogen oxide may be employed in the process if desired.

The amount of aqueous acidic media used is generally in an amount of about 10 to 100,000 parts per part by weight of nitrogen oxide and greater or lesser concentrations can also be effectively used.

The pH of the aqueous acidic media used is generally below 7 and preferably between 1 and 4.

The acidic pH of the media can be obtained by use of an acid, preferably a mineral acid such as hydrochloric, or sulfuric acid, and the like. The amount of such acid for achieving the desired pH will be obvious to one skilled in the art.

The temperature of the process is usually conducted at a temperature in the range of about 10° to 60° C, and preferably about 20° to 30° C.

The time of the process depends on the flow rates of the gases involved, the concentration of the gases in the aqueous media and the temperature. In general, flow rates of hydrogen sulfide of about 10 to 50 cc/min are used and flow rates of nitrogen oxide of about 5 to 30 cc/min are generally used. Greater or lesser flow rates will depend on the actual conditions employed and modifications thereof will be obvious to one skilled in the art for achieving high yields of hydroxylamine.

Yields of hydroxylamine, based on the amount of $NO_x$ consumed, are generally in the range of about 60 to 100 percent of theory.

An advantage of the process is that unreacted hydrogen sulfide and nitrogen oxide gases in the aqueous acidic solution can be collected and recycled for further reaction as in a continuous process.

Any conventional type of apparatus useful in feeding gaseous streams into an aqueous slurried mixture containing a solid catalyst can be employed. Preferably, the gaseous feed streams are fed into a stirred slurry of the catalyst by means of gas dispersion tubes. However, other methods for feeding gaseous streams into an aqueous acidic dispersion of the catalyst may be employed. Optionally, instead of using a slurried catalyst, use can be made of columns containing the catalyst in aqueous dispersed beds through which the gaseous feed streams of hydrogen sulfide and nitrogen oxide are passed. Modifications of the apparatus design and process will be obvious to one skilled in the art.

A preferred embodiment of the invention process is where feed streams of hydrogen sulfide and nitrogen oxide in a 3:1 molar ratio, respectively, are fed into an aqueous acidic media of about pH 1 to 4 containing solid activated carbon catalyst, at a temperature of about 10° to 60° C, at a pressure of about 1 atmosphere, and substantially in the absence of elemental oxygen.

The following examples illustrate the best mode of carrying out the invention process as contemplated by us but should not be construed as being limitations on the scope of spirit of the instant invention.

EXAMPLE 1

A series of runs were made in which regulated gas feeds of nitric oxide, or mixtures of nitrogen oxides, at 9cc/min. and hydrogen sulfide at 27 cc/min., were concurrently passed through a gas dispersion tube into a rapidly stirred solution of 480 ml. aqueous hydrochloric acid. Substantially all of the air in the system and in the aqueous reaction medium was flushed out of the system after several minutes of purging the system with nitrogen. The pH of the solution was varied from values of 1 to 8. Aliquots of the solution were periodically removed during the reaction and analyzed by gas chromatography versus known standards. When catalysts were employed in the run, 0.05 grams of catalyst of −100 to +140 mesh average particle size were used, and the catalyst was slurried in the aqueous media during the reaction. The following Table summarizes the results of the runs including the molar ratios of $H_2S/NO_x$ used, the pH of the aqueous media, the type of catalyst used, and the hydroxylamine concentration of the aqueous media after a certain indicated reaction time. Unless otherwise indicated, the reaction was conducted at ambient temperatures, of about 20° to 25° C, and at atmospheric pressure. Analysis for hydroxylamine was carried out by a photometric procedure as described in Analytical Chemistry, Vol. 40, p. 646 (1968), and by-product ammonia was analyzed by a standard Kjeldhal determination of the distillate from a basic solution of the reaction mixtures. Asterisks are displayed in the Table to point out comparative examples in the Table where no catalyst was used.

TABLE 1

| Run | Molar Ratio of $H_2S/NO$ | pH | Catalyst | $NH_2OH$ conc. ($\times 10^{-4}$) | Reaction Time |
|---|---|---|---|---|---|
| 1 | 3/1 | 6 | none* | 5.6 | 65 min. |
| 2 | 3/1 | " | $Co/Al_2O_3$ | 10.6 | " |
| 3 | 3/1 | " | JXC Act.C | 10.3 | " |
| 4 | 3/1 | " | Ni/W | 7.8 | " |
| 5 | 3/1 | " | Co/Mo | 6.9 | " |
| 6 | 3/1 | " | $Cr_2O_3$ | 4.6 | " |
| 7 | 3/1 | 1 | Lignite charcoal | 12.1 | 60 min. |
| 8 | 3/1 | " | 13X mol. sieve | 7.2 | " |
| 9 | 3/1 (60° C) | " | none* | 1.7 | " |
| 10 | 3/1 | " | JXC Act.C | 24.1 | " |
| 11 | 3/1 | 8 | none* | 1.1 | " |
| 12 | 3/1 | 4 | none* | 1.4 | " |
| 13 | 3/1 | 1 | none* | 1.1 | " |
| 14 | 3/1($H_2S/N_2O_3$) | 6 | none* | 3.9 | " |
| 15 | 3/1($H_2S/NO_2$) | 1 | none* | 11.0 | 100 min. (large $NH_3$ formation) |

As is seen in the above Table, Run 10, conducted at a pH of about 1 and at 20°–25° C, in the presence of activated carbon catalyst, (designated as JXC Act. C.) produced the largest concentration of hydroxylamine after a 60 minute reaction time between hydrogen sulfide and nitric oxide. It is considered that the use of a sulfur-resistant catalyst, as described herein, in Runs 14 and 16, would result in higher conversion and yields of hydroxylamine after a 60 minute reaction time. It is also considered that the presence of a substantial quantity of air or elemental oxygen in the reaction mixture of any of the above Runs, would produce lower yields of hydroxylamine and higher yields of by-product ammonia.

We claim:

1. In a process for producing hydroxylamine including reacting excess hydrogen sulfide with nitric oxide, or mixtures of nitrogen oxides, in aqueous acidic media of pH below 7 at ambient temperature and pressure, the improvement which comprises conducting the reaction in the presence of a solid sulfur-resistant catalyst and substantially in the absence of elemental oxygen.

2. The improvement in accordance with claim 1 wherein said catalyst is selected from the group consisting of activated carbon, molecular sieves, supported or non-supported sulfided materials of cobalt, molybdenum, nickel, tungsten, rhodium, platinum, palladium, iron, bismuth and mixtures thereof.

3. The improvement in accordance with claim 2 wherein said catalyst is activated carbon.

4. The improvement in accordance with claim 1 wherein said catalyst has an average particle size in the range of about −100 to +140 mesh average particle size.

5. The improvement in accordance with claim 1 wherein said catalyst is present in an amount of about 0.05 to 0.2 parts per part by weight of hydrogen sulfide.

6. The improvement in accordance with claim 1 wherein the hydrogen sulfide/nitric oxide molar ratio is about 3:1, the pH of the aqueous acidic media is about 1 to 4, the temperature is about 10° to 60° C. and said catalyst is activated carbon.

* * * * *